(No Model.)  4 Sheets—Sheet 1.
L. GUTMANN.
ELECTRIC COMMUTATOR.
No. 419,662.  Patented Jan. 21, 1890.
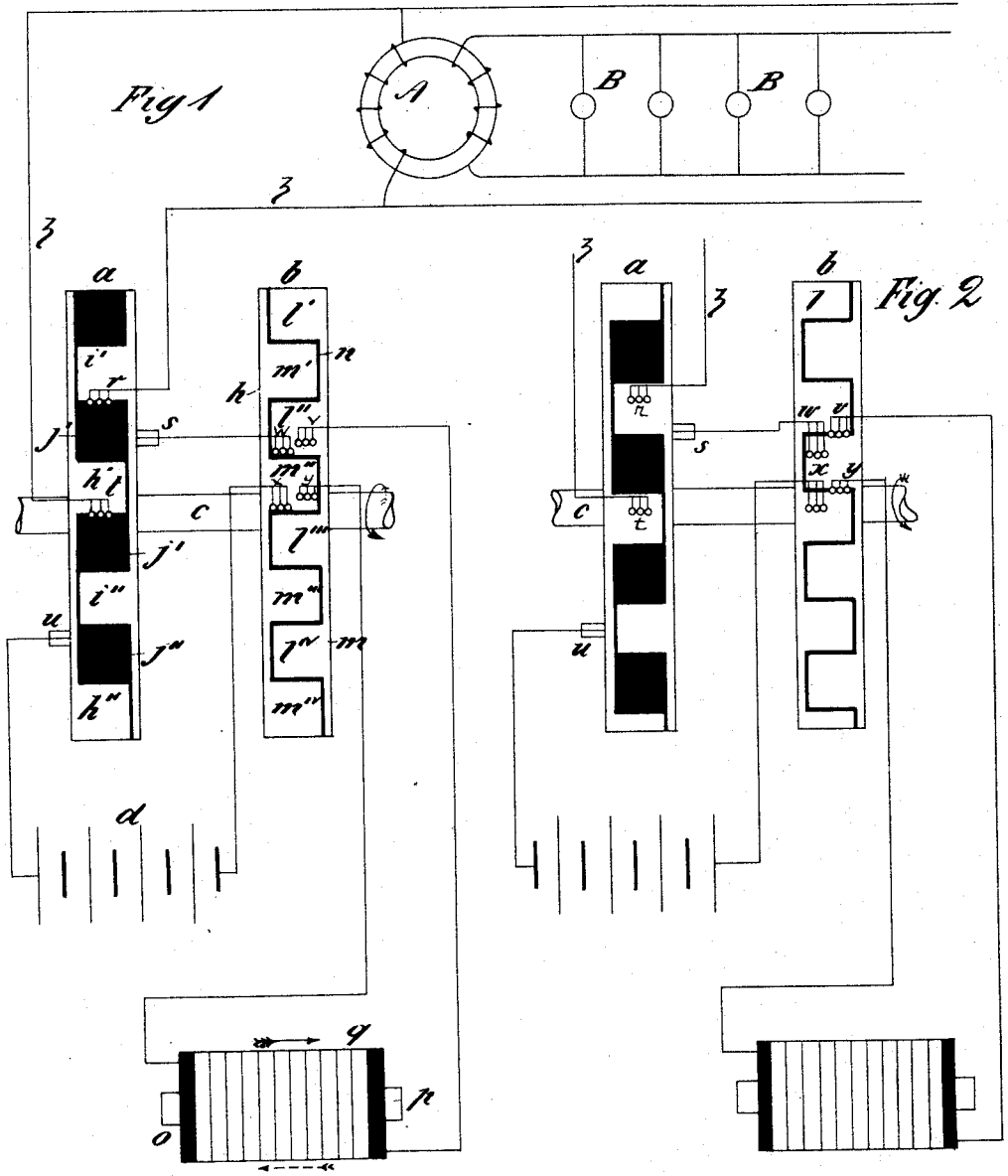
ATTEST
Ferdinand Strick
George H. Murray
INVENTOR
Ludwig Gutmann
by his Attorney
Edward P. Thompson (No Model.) 4 Sheets—Sheet 2.
L. GUTMANN.
ELECTRIC COMMUTATOR.
No. 419,662. Patented Jan. 21, 1890.
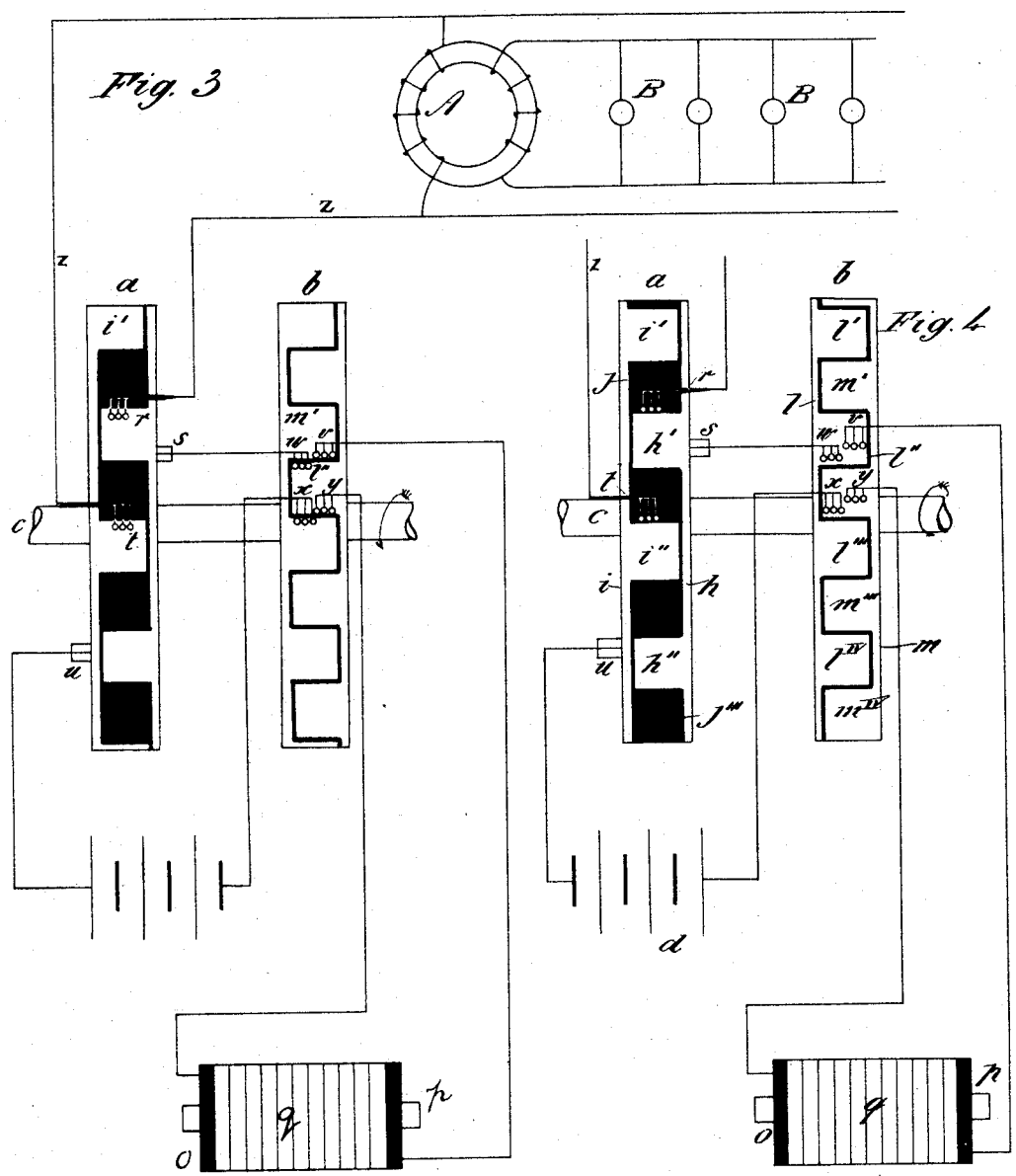
ATTEST
Ferdinand Strick
George H. Murray
INVENTOR
Ludwig Gutmann
by his Attorney
Edward P. Thompson (No Model.) 4 Sheets—Sheet 3.
L. GUTMANN.
ELECTRIC COMMUTATOR.
No. 419,662. Patented Jan. 21, 1890.
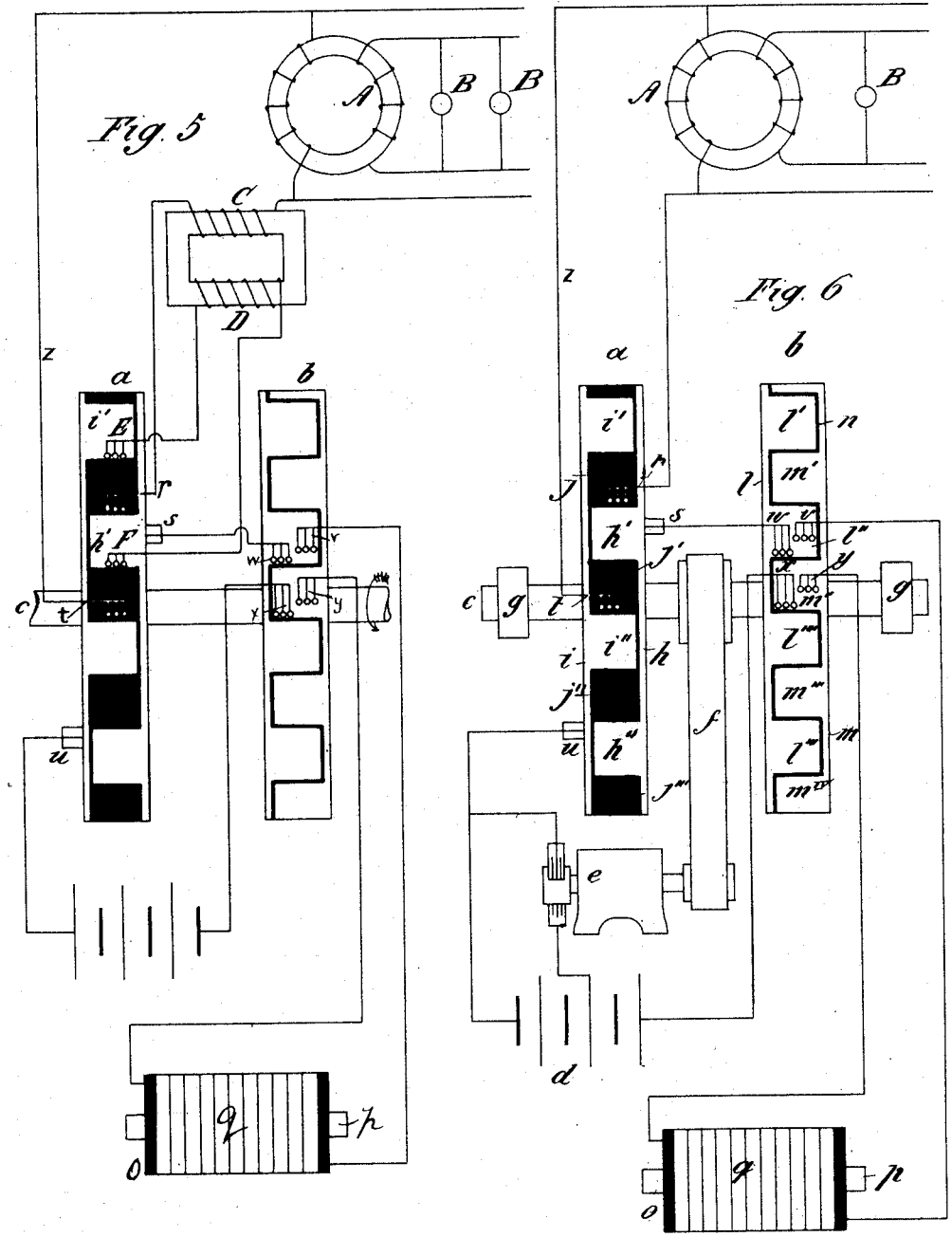
ATTEST
Ferdinand Strick
George A. Murray
INVENTOR
Ludwig Gutmann
by his Attorney
Edward P. Thompson (No Model.)
4 Sheets—Sheet 4.
L. GUTMANN.
ELECTRIC COMMUTATOR.
No. 419,662.
Patented Jan. 21, 1890.
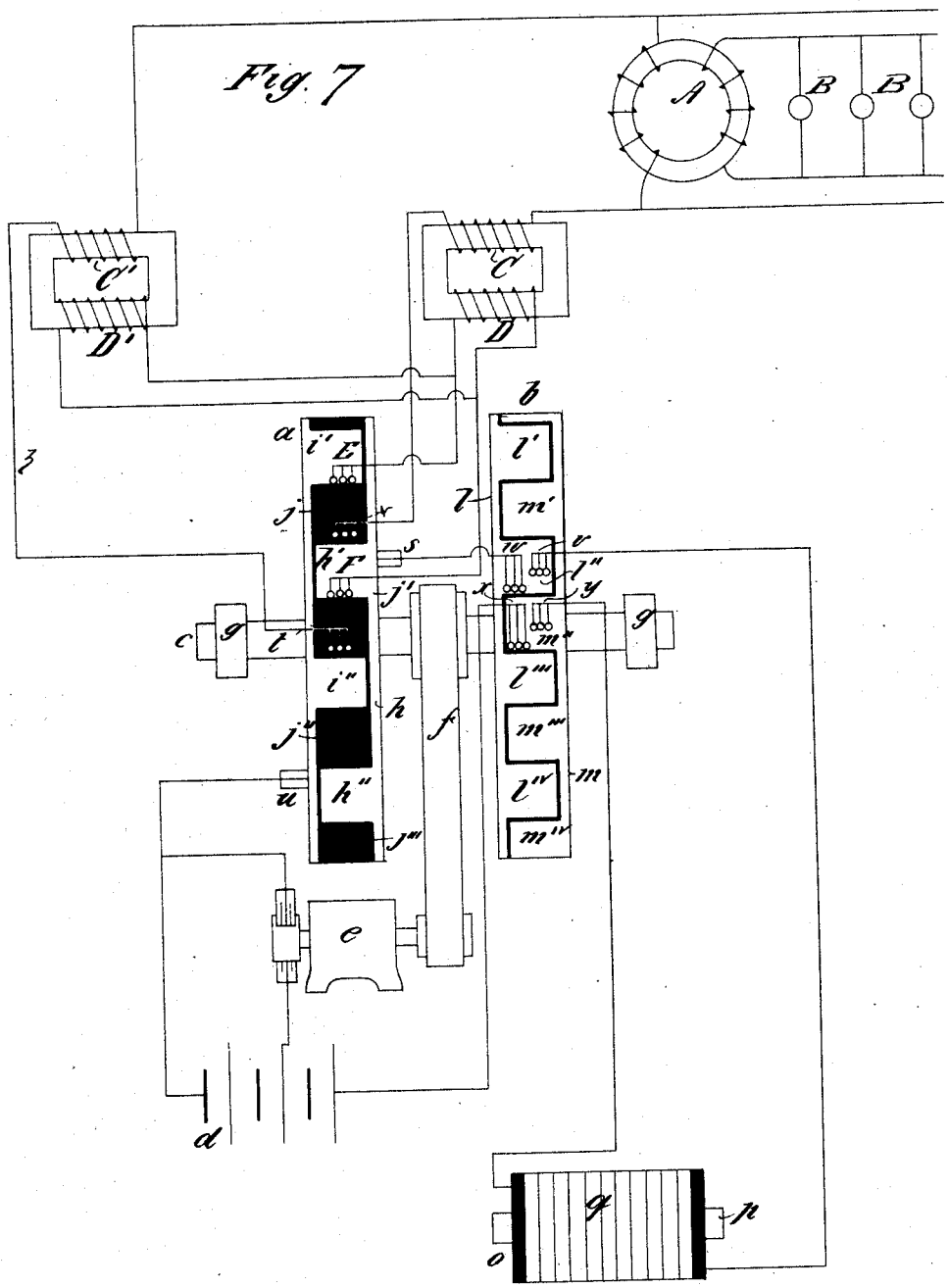
ATTEST,
INVENTOR,
Ludwig Gutmann
by his Attorney
Edward P. Thompson.

UNITED STATES PATENT OFFICE.

LUDWIG GUTMANN, OF FORT WAYNE, INDIANA.

ELECTRIC COMMUTATOR.

SPECIFICATION forming part of Letters Patent No. 419,662, dated January 21, 1890.

Application filed September 18, 1888. Serial No. 285,760. (No model.)

*To all whom it may concern:*

Be it known that I, LUDWIG GUTMANN, an alien and a subject of the Emperor of Germany, and a resident of Fort Wayne, county of Allen, State of Indiana, have invented certain new and useful Improvements in Electric Commutators, of which the following is a specification.

My invention relates to a device for changing a continuous current such as is generated by a battery or direct-current dynamo into an alternating current of a similar nature to that which is produced by an alternating-current dynamo.

The object of the invention is the production of alternating currents from direct continuous currents.

The invention is fully described by reference to the accompanying drawings.

Figures 1, 2, 3, and 4 show the successive stages or phases of the device as the shaft rotates. Fig. 6 shows the complete system in its normal condition, while Figs. 5 and 7 are views of modifications.

Referring to Fig. 6, the system consists of the combination of two commutators $a$ and $b$, mounted upon a common shaft $c$; a continuous-current generator, such as a battery $d$, of which two cells are in circuit with the small motor $e$, employed in rotating the shaft $c$, through the medium of the belt $f$, and bearings $g$ for the shaft $c$. The commutator $a$ consists of the combination of two conductor-disks $h$ and $i$, having, respectively, projections $h'$ $h^2$ $h^3$, &c., and $i'$ $i^2$ $i^3$, &c., which projections and disks are separated by insulating-pieces $j$ $j'$ $j^2$, &c., which are of equal width to the plates or projections $i'$ $i^2$ $i^3$, &c. For the sake of simplicity of explanation, the cylindrical surface of each commutator is evolved into a flat surface, thereby showing the true dimensions of the insulation and plates.

The commutator $b$ consists of the combination of two disks $l$ and $m$, having, respectively, projections or conducting-plates $l'$ $l^2$ $l^3$, &c., and $m'$ $m^2$ $m^3$, &c., the disks and plates being separated from one another by insulation $n$. As this insulation is so thin as merely to separate the two sets of plates and the disks, and as the two commutators are represented of equal diameter, it is evident that there are twice as many plates on commutator $b$ as there are on commutator $a$.

$o$ is a choking-magnet, consisting, substantially, of a core $p$, upon which is wound a coil $q$. When a current passes through the magnet, a self-induced current is produced in the circuit carrying the current at each make and break of the circuit.

Upon the commutator $a$ are brushes or contact-plates $r$ $s$ $t$ $u$, $r$ and $t$ being on the cylindrical surface, (which is shown flattened out,) and $s$ and $u$ being in contact with the opposite disks.

Upon the commutator $b$ are brushes $v$, $w$, $x$, and $y$, all upon the cylindrical surface, which is also represented as flattened.

In Fig. 6 the circuit may be followed by noticing that it starts from one pole of the generator to the brush $x$, to the plate $m^2$, to the brush $y$, to and through the magnet $o$, to the brush $v$, to the plate $l^2$, to the brush $w$, to the brush $s$, to the disk $h$, to the insulation, where it stops. From the other pole of generator the circuit goes to the brush $u$, to the disk $i$, and there stops. The main line $z$, containing the converter A and lamps B, has the brush $r$ upon the insulation $j$ and the brush $t$ upon the insulation $j'$. It is evident that in this condition of the circuits the current is zero.

When the shaft rotates, the relative positions of the commutators and brushes change. The first change is represented in Fig. 1. The change consists in the brush $r$ coming upon the plate $i'$ and the brush $t$ upon the plate $h'$, so that it may be noticed that a circuit is completed from one pole of the generator to the other and including the choking-magnet and the main line. At the first instant the counter electro-motive force caused by the choking-magnet reduces or maintains the current at zero until the self-induction ceases, while the direct or generator current gradually increases, but not to maximum, as the choking-magnet offers a resistance due to the wire with which it is wound. The next change, which occurs in a mere instant of time, is represented by Fig. 2. This change consists in the brushes $v$ and $y$ connecting two contiguous plates of the commutator $b$, thereby short-circuiting the choking-magnet o. The current in this manner becomes maximum and remains so until the next change takes place, as shown in Fig. 3. It will be noticed that the brushes v and y entirely leave the plates they were on formerly and come upon the plates m' and l², respectively, while the brushes x and w remain on original plates. This change in position of brushes v and y produces simultaneously two changes of action. The one is the introduction into the circuit of the choking-magnet, thereby reducing the strength of the current from maximum to zero, and the other is the reversal of the direction of the current in the choking-magnet. The latter action is caused by the brushes v and y, which have changed their relation to the brushes x and w. The next instant, as shown in Fig. 4, brushes x and w change their relation, respectively, to the brushes v and y, and brushes t and r break the circuit at this moment. This is an instant after the current, by reintroduction of the choking-magnet, has been reduced by the induced current to zero. No sparking will occur at r and t, as there is no current flowing, and that which could be formed at w and x is counteracted by an induced current from o, which flows in opposition to the source, as the connection of brushes v w and x y has been changed from Fig. 3 to Fig. 4.

Should there be a longer time interval necessary for the change of brushes x and w across the insulation to allow the current to rise again, then I prefer to place in the main circuit a converter, as shown in Fig. 5, whose one coil is C and the other D. The coil C is in the main line and the coil D is terminated by one brush E at the lower part of the plate i' and by another brush F at the lower part of the plate h'. The moment brushes r and t make contact or close the circuit the brushes E and F break or open their circuit, while E F close their circuit the moment r and t open their circuit. This equal and opposite action reduces the current in the main line to zero, and there will be no sparking at brushes r and t.

In Fig. 7 a converter C' is similarly inserted in the other main conductor z. The terminals of the coil D' are connected to the same brushes as those of the coil D.

To facilitate the explanation of the various simultaneous actions done by the current-reverser, it has to be considered as consisting of two separate and distinct commutators; but it is evident that the two sets of contact-terminals may be mounted upon the same drum, as they rotate with the same speed. Therefore each part or set of contacts has in reality to be considered as a subdivision, and both together form one commutator or one current-reverser.

The working of choking-magnets in combination with a generator, commutator, and work-circuits can be accomplished either by placing the choking-magnet in series into the line, as shown in Figs. 1, 2, 3, 4, and 6, or in parallel, as shown in Fig. 5, where choking-magnet R', which is wound with two independent coils C and D, has the reacting coils connected across the line of the work-circuit as well as across that of the generator.

I claim as my invention—

1. In a commutating system, the combination, with a shaft adapted to rotate, of a drum rigidly attached thereto, two pairs of contact-points attached to the said drum, but insulated from the shaft, the contact-points of each said pair being electrically insulated from one another, a continuous or pulsating current-generator in electric connection with one terminal of each pair, a choking-magnet in electric contact with both contact-points of one pair, electric connection from the contact-points of one pair to the contact-points of the other pair, and main-line terminals bearing upon the contact-points of the last-named pair of contact-points.

2. In a commutating system, the combination, with a divided commutator, each division having contacts alternately of opposite polarity, of a direct-current generator, one or more choking magnets, and a work-circuit, the generator having one pole or terminal connected to one division, the other pole or terminal to the second division, the choking-magnet having its terminals connected to the first-named division and the work-circuit terminals in electric contact with the second division.

3. In a commutating system, the combination of the following elements of a generator of electricity in combination with one or more choking-magnets electrically connected to a commutator having its contact-points of positive and negative polarity organized alternately around the circumference and work-circuit terminals in electric connection with the said commutator.

4. The combination of two commutators and a choking-magnet, the three above-named elements being normally arranged in circuit with a continuous-current generator, the terminals of the main line being adapted to touch alternately a positive pole of the source, insulation, a negative pole of the source, insulation, and so on in a similar manner, and the terminals of the choking-magnet being connected to the other commutator.

In testimony that I claim the foregoing as my invention I have signed my name, in presence of two witnesses, this 7th day of September, 1888.

LUDWIG GUTMANN.

Witnesses:
WILLIAM C. RYAN,
DANIEL RYAN.